United States Patent
Depreville et al.

(10) Patent No.: US 10,361,622 B2
(45) Date of Patent: Jul. 23, 2019

(54) CONVERTERS FOR HVDC POWER TRANSMISSION AND DISTRIBUTION

(71) Applicant: General Electric Technology GmbH, Baden (CH)

(72) Inventors: Guillaume Depreville, Massy (FR); Stephane Brehaut, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/780,842

(22) PCT Filed: Nov. 22, 2016

(86) PCT No.: PCT/EP2016/078472
§ 371 (c)(1),
(2) Date: Jun. 1, 2018

(87) PCT Pub. No.: WO2017/093083
PCT Pub. Date: Jun. 8, 2017

(65) Prior Publication Data
US 2018/0358888 A1    Dec. 13, 2018

(30) Foreign Application Priority Data

Dec. 4, 2015 (GB) .................................. 1521460.4

(51) Int. Cl.
*H02J 3/36* (2006.01)
*H02M 1/32* (2007.01)
(Continued)

(52) U.S. Cl.
CPC ............ *H02M 1/32* (2013.01); *H02H 1/0007* (2013.01); *H02H 7/1216* (2013.01); *H02J 3/36* (2013.01);
(Continued)

(58) Field of Classification Search
CPC ............... H02M 1/32; H02M 7/483; H02M 2001/0009; H02M 2001/325
(Continued)

(56) References Cited

U.S. PATENT DOCUMENTS 4,803,611 A * 2/1989 Sashida .................... H02M 7/48
363/132
4,958,117 A * 9/1990 Kerkman ............. H02H 7/0855
318/803

(Continued)

FOREIGN PATENT DOCUMENTS

EP    1612924 A2    1/2006
EP    2884653 A1    6/2015

OTHER PUBLICATIONS

International Search Report and Written Opinion issued in connection with corresponding PCT Application No. PCT/EP2016/078472 dated Feb. 17, 2017.

(Continued)

*Primary Examiner* — Fred E Finch, III
*Assistant Examiner* — Nusrat Quddus
(74) *Attorney, Agent, or Firm* — Eversheds Sutherland (US) LLP (57) ABSTRACT

In the field of high voltage direct current power transmission and distribution there is provided a converter which includes first and second DC terminals for connection to a DC electrical network and between which extends converter limbs. Each converter limb includes first and second limb portions that are separated by an AC terminal for connection to a respective phase of a multi-phase AC electrical network. Each limb portion includes a current sensor to measure current flowing in the corresponding limb portion. The converter also includes further current sensors, located elsewhere in the converter, and a current sensor management unit. The current sensor management unit is programmed to:

(Continued)

receive a measured current value from each current sensor; identify at least one faulty current sensor from the received measured current values; and replace the measured current value of the or each identified faulty current sensor with a calculated current value.

14 Claims, 2 Drawing Sheets

(51) Int. Cl.
    *H02M 7/483*    (2007.01)
    *H02H 1/00*    (2006.01)
    *H02H 7/12*    (2006.01)
    *H02M 1/00*    (2006.01)

(52) U.S. Cl.
    CPC .... *H02M 7/483* (2013.01); *H02M 2001/0009* (2013.01); *H02M 2001/325* (2013.01); *H02M 2007/4835* (2013.01); *Y02E 60/60* (2013.01)

(58) Field of Classification Search
    USPC ...... 363/16, 17, 34, 36, 37, 41, 97, 98, 131, 363/132
    See application file for complete search history.

(56) References Cited

U.S. PATENT DOCUMENTS

| | | | | |
|---|---|---|---|---|
| 5,231,339 A * | 7/1993 | Kishimoto | ................ | B60L 9/18 318/807 |
| 5,592,371 A * | 1/1997 | Rajashekara | ....... | H02M 7/4826 363/132 |
| 6,021,052 A * | 2/2000 | Unger | .................... | H02J 9/062 363/133 |
| 6,169,677 B1 * | 1/2001 | Kitahata | ................. | H02M 7/49 363/132 |
| 6,239,996 B1 * | 5/2001 | Perreault | ................. | B60L 3/003 323/223 |
| 7,511,447 B2 * | 3/2009 | Ishikawa | ................ | B60L 11/14 318/139 |
| 8,558,496 B2 | 10/2013 | Welchko et al. | | |
| 8,674,647 B2 * | 3/2014 | Iwaji | .................... | B60L 15/025 318/400.01 |
| 8,867,181 B2 | 10/2014 | Hasan et al. | | |
| 8,907,647 B2 * | 12/2014 | Nakagawa | ........ | H02M 7/53871 323/222 |
| 2002/0154526 A1 * | 10/2002 | Sakai | .................. | H02M 1/4216 363/132 |
| 2003/0039130 A1 * | 2/2003 | Curtiss | .................... | G05F 1/613 363/37 |
| 2010/0067266 A1 | 3/2010 | Dommaschk et al. | | |
| 2010/0226157 A1 * | 9/2010 | Ohnishi | .............. | H02M 5/4585 363/131 |
| 2011/0110138 A1 | 5/2011 | Fahimi et al. | | |
| 2011/0149624 A1 * | 6/2011 | Yamanaka | .......... | H02M 5/4585 363/131 |
| 2013/0194853 A1 * | 8/2013 | Tokuyama | .............. | H01L 23/36 363/131 |
| 2013/0258734 A1 * | 10/2013 | Nakano | ................. | H02M 7/537 363/131 |
| 2013/0264984 A1 * | 10/2013 | Tamura | .................... | H02M 7/48 318/400.27 |
| 2014/0321182 A1 * | 10/2014 | Takamatsu | ................ | B60L 7/14 363/132 |
| 2015/0043253 A1 * | 2/2015 | Awane | ................ | H02M 1/4258 363/37 |
| 2015/0256095 A1 * | 9/2015 | Ohta | .................... | H02M 7/4826 363/37 |
| 2015/0365008 A1 * | 12/2015 | Ogino | ..................... | H02M 1/14 363/37 |
| 2016/0126854 A1 * | 5/2016 | Yuasa | .................... | H02P 27/06 62/508 |

OTHER PUBLICATIONS

Search and Examination Report issued in connection with corresponding GB Application No. 1521460.4 dated Apr. 25, 2016.

* cited by examiner

| | | | | | |
|---|---|---|---|---|---|
| 1 | 0 | 0 | 0 | 1 | 0 |

Figure 2B

|  | IPhaseA | IPhaseB | IPhaseC | IDCT | IDCB | ITA | ITB | ITC | IBA | IBB | IBC |
|---|---|---|---|---|---|---|---|---|---|---|---|
| Eq.1 | 1 | 0 | 0 | 0 | 0 | 1 | 0 | 0 | 1 | 0 | 0 |
| Eq.2 | 0 | 1 | 0 | 0 | 0 | 0 | 1 | 0 | 0 | 1 | 0 |
| Eq.3 | 0 | 0 | 1 | 1 | 0 | 1 | 0 | 1 | 0 | 0 | 1 |
| Eq.4 | 0 | 0 | 0 | 0 | 1 | 0 | 1 | 1 | 0 | 0 | 0 |
| Eq.5 | 0 | 1 | 1 | 0 | 0 | 0 | 0 | 0 | 1 | 1 | 1 |
| Eq.6 | 1 | 0 | 0 | 1 | 0 | 0 | 0 | 0 | 0 | 0 | 0 |
| Eq.7 | 0 | 0 | 0 | 0 | 1 | 0 | 0 | 0 | 0 | 0 | 0 |

CONVERTERS FOR HVDC POWER TRANSMISSION AND DISTRIBUTION

FIELD OF THE INVENTION

This embodiment relates to a converter, for use in high voltage direct current (HVDC) power transmission and distribution.

BACKGROUND

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC networks operating at different frequencies. In any such power transmission network, converters are required at each interface between AC and DC power to effect the required conversion.

SUMMARY

According to a first aspect of the embodiment, there is provided a converter, for use in HVDC power transmission and distribution, comprising:
a. first and second DC terminals for connection to a DC electrical network and between which extends a plurality of converter limbs, each converter limb including first and second limb portions separated by an AC terminal for connection to a respective phase of a multi-phase AC electrical network, and each limb portion including a current sensor to measure current flowing in the corresponding limb portion;
b. a plurality of further current sensors located elsewhere in the converter; and
c. a current sensor management unit programmed to:
  1. receive a measured current value from each current sensor;
  2. identify at least one faulty current sensor from the received measured current values; and
  3. replace the measured current value of the or each identified faulty current sensor with a calculated current value.

The provision of a converter in which each limb portion includes a current sensor desirably makes these sensors available for other control and monitoring operations within the converter and so avoids an unnecessary duplication of current sensors. More particularly such limb portion current sensors permit the other control and monitoring operations to accurately calculate the current flowing within a converter, i.e. the magnitude of any circulating currents within a converter, which in turn is very useful in helping to ensure accurate overall control of the converter.

In addition, the inclusion of a current sensor in each limb portion allows a replacement calculated current to be based on one of multiple other measured current values which provides for both a desired degree of accuracy in the replacement calculated current value and a degree of redundancy in terms of the number of measured current values that can be used.

Meanwhile, the additional inclusion of a plurality of further current sensors located elsewhere in the converter provides a further degree of redundancy within the number of current sensors as a whole to a level whereby the current sensor management unit is able to identify at least one faulty current sensor and thereafter replace the data provided by the or each such faulty current sensor with a replacement calculated current value.

In other words, the current sensor management unit is able to bypass the or each faulty current sensor and so permit continued operation of the converter without the need for a costly and inconvenient shutdown, e.g. to permit repair or replacement of a faulty current sensor which is permanently inoperative.

In this regard within the context of the embodiment a faulty current sensor is one that has permanently failed, i.e. is no longer operative, as well as one that is temporarily providing an erroneous measured value, e.g. because it has become saturated with current.

More particularly the plurality of further current sensors includes a respective current sensor operatively associated with each of the first and second DC terminals to measure current flowing into or out of the converter via the corresponding said first or second DC terminal.

In this way it is possible to measure exactly the DC current on an associated DC bus grid and thereby be able to calculate the DC power transferred from one the converter, e.g. to another converter via an interconnecting DC grid, or transferred to the converter in a similar manner, e.g. from another converter via an interconnecting DC grid.

The plurality of further current sensors may include a respective current sensor operatively associated with each of the AC terminals to measure current flowing into or out of the converter via the corresponding said AC terminal.

An advantage of including such AC sensors is the ability to measure exactly the AC current on an associated AC grid and thereby be able to calculate the AC power transferred between the converter and the AC grid.

The positioning of such further current sensors allows them also to be used for other control and monitoring operations within the converter.

Moreover, such further current sensors additionally contribute to the total number of current sensors available to provide measured current values upon which a replacement calculated current value can be based, and so further improves the accuracy and robustness of the replacement calculated current value.

Optionally the current sensor management unit is programmed to identify at least one faulty current sensor from the received measured current values by:
  i. establishing a respective sum of measured current values at each of a plurality of junction locations within the converter;
  ii. detecting an error in a respective sum of measured current values when the sum differs from a corresponding threshold current value;
  iii. establishing an error pattern representing the or each erroneous sum detected;
  iv. comparing the error pattern with a predetermined error reference defining a range of possible error patterns and corresponding faulty current sensors giving rise to the said possible error patterns; and
  v. identifying one or more faulty current sensors by matching the established error pattern with an identical corresponding possible error pattern in the error reference.

The inclusion of a current sensor management unit programmed in the foregoing manner desirably permits the discrimination of one or more faulty current sensors from the other, healthy sensors.

In a preferred embodiment of the invention the current sensor management unit is programmed to uniquely identify each individual faulty current sensor from the received measured current values by:
i. establishing a respective sum of measured current values at each of an initial number of junction locations within the converter;
ii. detecting an error in a respective sum of measured current values when the sum differs from a corresponding threshold current value;
iii. establishing an error pattern representing the or each erroneous sum detected;
iv. comparing the error pattern with a predetermined error reference defining all possible error patterns corresponding to each current sensor being faulty individually; and
v. identifying a given individual faulty current sensor by matching the established error pattern with an identical corresponding possible error pattern in the error reference.

A current sensor management unit programmed in such a manner desirably permits each individual faulty current sensor to be uniquely identified amongst other, healthy sensors.

The current sensor management unit may be additionally programmed to identify a plurality of multiple faulty current sensors from the received measured current values by:
a. establishing a respective sum of measured current values at each of the initial number of junction locations within the converter;
b. detecting an error in a respective sum of measured current values when the sum differs from a corresponding threshold current value;
c. establishing an error pattern representing the or each erroneous sum detected;
d. comparing the error pattern with a predetermined optimized error reference additionally defining uniquely discernible possible error patterns corresponding to multiple concurrently faulty current sensors; and
e. identifying a given group of multiple faulty current sensors by matching the established error pattern with an identical corresponding possible error pattern in the error reference.

Such a feature usefully extends the functionality of the current sensor management unit, and in particular permits the converter of the embodiment to continue operating even when more than one current sensor becomes faulty.

In another preferred embodiment of the invention the current sensor management unit is programmed to uniquely identify all possible pairs of faulty current sensors from the received measured current values by:
a. establishing a respective sum of measured current values at each of an extended number of junction locations within the converter, the extended number of junctions being larger than the initial number of junctions;
b. detecting an error in a respective sum of measured current values when the sum differs from a corresponding threshold current value;
c. establishing an error pattern representing the or each erroneous sum detected;
d. comparing the error pattern with a predetermined extended error reference defining all possible error patterns corresponding to faulty pairs of current sensors; and
e. identifying a given pair of faulty current sensors by matching the established error pattern with an identical corresponding possible error pattern in the extended error reference.

Having a current sensor management unit that is able to uniquely identify any given pair of faulty current sensors extends the functionality of the current sensor management unit to further possible fault scenarios, as well as helping to ensure that the converter of the embodiment remains operational when any given pair of current sensors becomes faulty.

Optionally the current sensor management unit is additionally programmed to identify a plurality of three or more faulty current sensors from the received measured current values by:
a. establishing a respective sum of measured current values at each of the extended number of junction locations within the converter;
b. detecting an error in a respective sum of measured current values when the sum differs from a corresponding threshold current value;
c. establishing an error pattern representing the or each erroneous sum detected;
d. comparing the error pattern with a predetermined optimized extended error reference additionally defining uniquely discernible possible error patterns corresponding to three or more concurrently faulty current sensors; and
e. identifying a given group of three of more faulty current sensors by matching the established error pattern with an identical corresponding possible error pattern in the error reference.

Such a features extends still further the functionality of the current sensor management unit, and more particularly assist the converter of the embodiment to remain operational when three or more current sensors become faulty.

More particularly the corresponding threshold current value is the same for each current sensor. Maintaining the same threshold current value for each current sensor is readily implementable and reduces the complexity of the current sensor management unit.

In other preferred embodiments of the invention the corresponding threshold current value for at least one current sensor is tailored specifically to the current sensor. Tailoring the threshold current value for one or more current sensors can be used to beneficially accommodate differing operating conditions within different parts of the converter.

Optionally the established error pattern takes the form of a vector and each corresponding error reference takes the form of a matrix.

Such features permit the ready manipulation of the error pattern and error reference, i.e. ready cross-checking of the error pattern against the error reference to identify a possible match.

In a still further preferred embodiment of the invention the current sensor management unit is programmed to replace the measured current value of the or each identified faulty current sensor with a calculated current value derived from the measured current values from the other healthy current sensors.

Having the current sensor management unit programmed in such a manner allows for the timely and accurate replacement of an erroneous measured current value from a faulty current sensor.

The current sensor management unit may be further programmed to compare measured current values from a current sensor identified as faulty with calculated equivalent current values and, if the measured current values equal the corresponding calculated equivalent current values within a predetermined time period, reclassify the current sensor as healthy.

Further programming the current sensor management unit in such a manner desirably permits the differentiation between a faulty current sensor that is permanently inoperative and a faulty current sensor that is only temporarily impaired, e.g. because it has become momentarily saturated with current.

In an embodiment the current sensor management unit is further programmed to correct a constant error in a received measured current value from one or more current sensors.

The ability to correct a constant error, e.g. a constantly low or high measurement, permits the continued use of an otherwise useable current sensor, and so avoids the need to shut down the converter to repair or replace the current sensor.

The converter may optionally additionally comprise a converter control unit programmed to shut down the converter if the current sensor management unit identifies at least one faulty current sensor that is permanently inoperative.

The inclusion of such a converter control unit permits the safe shut down of the converter in circumstances where the permanent failure of one or more current sensors could lead to uncontrolled operation of the converter.

BRIEF DESCRIPTION OF DRAWINGS

There now follows a brief description of preferred embodiments of the invention, by way of non-limiting example, with reference being made to the following figures in which.

DETAILED DESCRIPTION OF THE INVENTION

Figure 1:
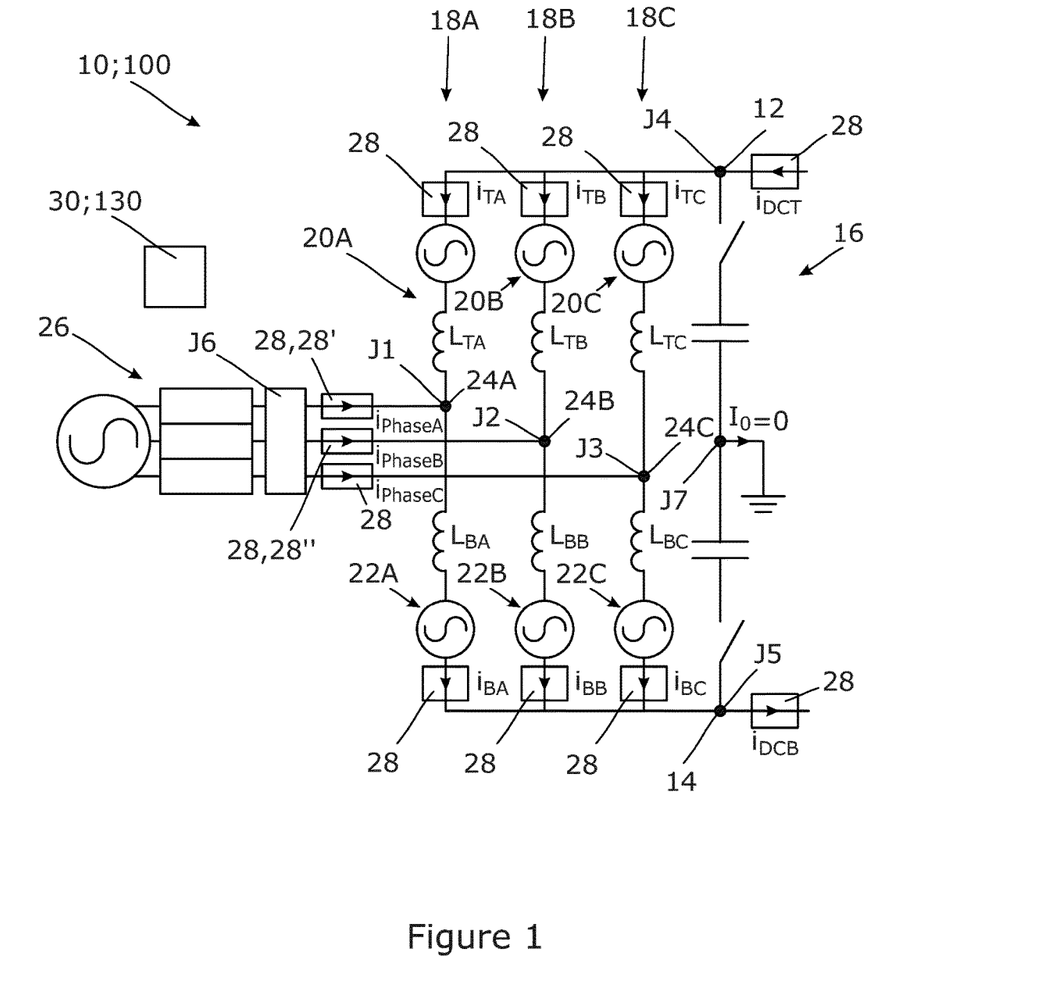
FIG. 1 shows a schematic view of respective converters according to first and second embodiments of the invention.

A converter according to a first embodiment of the invention is designated generally by reference numeral 10.

The first converter 10 includes first and second DC terminals 12, 14 which, in use, are connected to a DC electrical network 16. Three converter limbs 18A, 18B, 18C extend between the first and second DC terminals 12, 14, and each converter limb 18A, 18B, 18C includes first and second limb portions 20A, 22A, 20B, 22B, 20C, 22C that are separated by a corresponding AC terminal 24A, 24B, 24C which is, in use, connected to a respective phase A, B, C of a three-phase AC electrical network 26.

In other embodiments of the invention (not shown) the converter may include fewer than three converter limbs, e.g. two converter limbs if intended for operation with a two-phase AC electrical network, or more than three converter limbs.

Returning to the embodiment shown, each limb portion 20A, 20B, 20C, 22A, 22B, 22C includes a current sensor 28 to measure the current $i_{TA}$, $i_{TB}$, $i_{TC}$, $i_{BA}$, $i_{BB}$, $i_{BC}$ flowing in the corresponding limb portion 20A, 20B, 20C, 22A, 22B, 22C.

In addition, the first converter 10 includes further respective current sensors 28, each of which is operatively associated with a given one of the first and second DC terminals 12, 14 to measure the current $i_{DCT}$, $i_{DCB}$ flowing into or out of the converter 10 via the corresponding said first or second DC terminal 12, 14.

The first converter 10 also includes still further respective current sensors 28, each of which is operatively associated with a given one of the AC terminals 24A, 24B, 24C to measure the current $i_{PhaseA}$, $i_{PhaseB}$, $i_{PhaseC}$ flowing into or out of the converter 10 via the corresponding said AC terminal 24A, 24B, 24C.

Other embodiments of the invention may include fewer than or more than the five further respective current sensors mentioned hereinabove, and in particular may include only two further current sensors operatively associated with the first and second DC terminals, or only three further current sensors operatively associated with the AC terminals.

In each instance, each of the current sensors more particularly has the same bandwidth.

The first converter 10 shown also includes a first current sensor management unit 30 that is programmed to:

i. receive a measured current value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ from each current sensor 28;

ii. identify at least one faulty current sensor 28 from the received measured current values value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$, i.e. identify at least one permanently inoperative current sensor or current sensor that is temporarily providing an erroneous measured value; and iii. replace the measured current value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ of the or each identified faulty current sensor 28 with a calculated current value.

The first current sensor management unit 30 is a programmable microcontroller, although other types of controller may be used.

The programmable first current sensor management unit 30 is programmed to identify at least one faulty current sensor 28 from the received measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ by:

a. establishing a respective sum of measured current values $i_{TA}$, $i_{BA}$, 11B, $i_{BB}$, $i_{TC}$, $i_{BC}$, $i_{DCT}$, $i_{DCB}$, $i_{PhaseA}$, $i_{PhaseB}$, $i_{PhaseC}$ at each of a plurality of junction locations within the converter 10;

b. detecting an error in a respective sum of measured current values when the sum differs from a corresponding threshold current value $\Delta I_{Threshold}$;

c. establishing an error pattern that represents the or each erroneous sum detected;

d. comparing the error pattern with a predetermined error reference which defines a range of possible error patterns and corresponding faulty current sensors 28 that give rise to the said possible error patterns; and e. identifying one or more faulty current sensors 28 by matching the established error pattern with an identical corresponding possible error pattern in the error reference.

More particularly, the first current sensor management unit 30 is programmed to uniquely identify each individual faulty current sensor 28 from the received measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$.

The first current sensor management unit 30 achieves this by:

a. establishing a respective sum of measured current values at each of an initial number of seven junction locations J1, J2, J3, J4, J5, J6, J7 within the converter 10;

b. detecting an error in a respective sum of measured current values when the sum differs from the corresponding threshold current value $\Delta I_{Threshold}$;
c. establishing an error pattern which represents the or each erroneous sum detected;
d. comparing the error pattern with a predetermined error reference that defines all possible error patterns which correspond to each current sensor 28 being faulty individually; and
e. identifying a given individual faulty current sensor 28 by matching the established error pattern with an identical corresponding possible error pattern in the error reference.

The foregoing steps are described in more detail below.

The respective sum of measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ at each of the seven junction locations J1, J2, J3, J4, J5, J6, J7 is established as follows:

$i_{PhaseA} - i_{TA} + i_{BA}$  J1:

$i_{PhaseB} - i_{TB} + i_{BB}$;  J2:

$i_{PhaseC} - i_{TC} + i_{BC}$;  J3:

$i_{DCT} - i_{TA} - i_{TB} - i_{TC}$;  J4:

$i_{DCB} - i_{BA} - i_{BB} - i_{BC}$;  J5:

$i_{PhaseA} + i_{PhaseB} + i_{PhaseC}$; and  J6:

$i_{DCT} - i_{DCB}$  J7:

According to Kirchhoff's current law, the sum of currents flowing into a given node, i.e. a given junction J1, J2, J3, J4, J5, J6, J7, is equal to the sum of currents flowing out of that node. Hence each of the respective sums set out above should, under normal operating conditions, theoretically equal zero.

The first current sensor management unit 30 is therefore programmed to detect an error in a respective sum of measured current values when the sum deviates from the expected value of zero. In a practical embodiment this is implemented by considering whether a given sum is greater than or equal to a corresponding threshold current value $\Delta I_{Threshold}$ which is able to take account of any inaccuracy in the measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$, as well as more particularly being based on an absolute value. In the embodiment described the threshold current value $\Delta I_{Threshold}$ is selected as being the same value, zero, for each current sensor 28. In other embodiments, however, a different value may be chosen, and indeed one or more different values may be chosen for different current sensors 28.

For example, in the case of the current sensor 28' operatively associated with AC terminal 24A relating to the first phase A of the AC electrical network 26 becoming faulty, e.g. becoming permanently inoperative or temporarily providing erroneous measurements each of the J1 and J6 sums set out above would return a non-zero result.

The first current sensor management unit 30 is therefore able to establish an error pattern that represents each of the erroneous sums detected. In the embodiment shown the error pattern takes the form of a vector, although other forms are also possible.

Figure 2A:
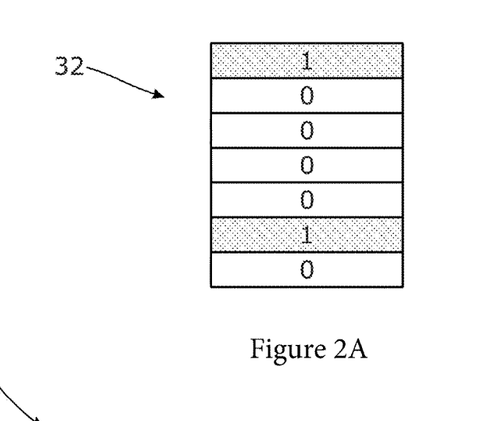
FIG. 2A shows a detection vector utilised by the first embodiment of the invention.

Again, continuing with the example of the phase A current sensor 28' becoming faulty, the error pattern which represents the erroneous sums that are detected, i.e. the erroneous J1 and J6 sums, is a detection vector 32, as shown in FIG. 2(a). Each row in the detection vector 32 corresponds to the sum of measured currents values at a particular junction J1, J2, J3, J4, J5, J6, J7 and a 'zero' indicates that no error was identified in the associated sum while a 'one' indicates that an error was detected.

Thereafter the first current sensor management unit 30 is programmed to compare the error pattern, i.e. the detection vector 32, with a predetermined error reference which defines all possible error patterns corresponding to each current sensor 28 becoming faulty individually.

Figure 2B:
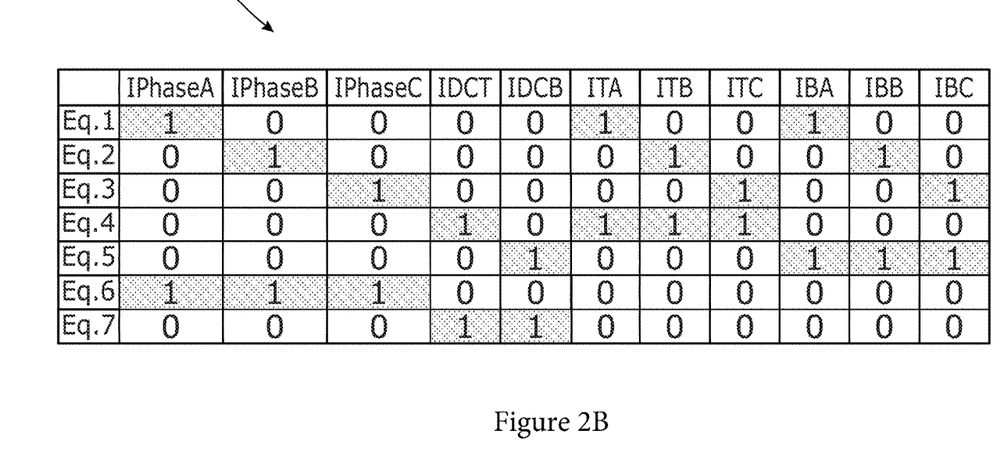
FIG. 2B shows an identity matrix also utilised by the first embodiment of the invention.

In the embodiment described herein the error reference takes the form of a matrix, and more particularly an identity matrix 34, as shown in FIG. 2(b). In the identity matrix 34 each row again corresponds to the sum of measured currents values at a particular junction J1, J2, J3, J4, J5, J6, J7 (as identified as a corresponding equation, i.e. Eq. 1, Eq. 2 in FIG. 2(b)), while each column relates to a particular current sensor 28.

'Zeros' and 'ones' are included in the rows of each column to indicate the pattern of erroneous sums, i.e. the respective error pattern, which would arise in the event of the current sensor 28 to which the column corresponds becoming faulty (with a 'zero' indicating that no error would arise and a 'one' indicating that an error would arise).

The first current sensor management unit 30 is programmed to then identify a given individual faulty current sensor by matching the established error pattern, i.e. the detection vector 32, with an identical corresponding possible error pattern in the error reference, i.e. the identity matrix 34.

Accordingly, utilising again the example of the phase A current sensor 28' becoming faulty, the established error pattern set out in the detection vector 32 matches the error pattern of the $i_{PhaseA}$ column of the identity matrix 34 which is thereby indicative of the current sensor 28 which measures the $i_{PhaseA}$ current value becoming faulty, i.e. the phase A current sensor 28' becoming faulty.

In further embodiments of the invention (not shown) the first current sensor management unit 30 may be additionally programmed to identify a plurality of multiple faulty current sensors from the same received measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ and a consideration of the respective sums of measured current values at the same initial junctions J1, J2, J3, J4, J5 J6, J7.

For example, the first current sensor management unit 30 may be programmed to compare the error pattern representing the or each erroneous sum detected, i.e. the associated detection vector, with an optimized error reference, i.e. an optimized identity matrix, which is similar to the identify matrix 34 shown in FIG. 2(b) but additionally defines uniquely discernible possible error patterns corresponding to multiple current sensors becoming faulty, e.g. two or three current sensors becoming faulty concurrently.

The number of multiple current sensor fault scenarios that are uniquely identifiable based on the aforementioned number of measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ and respective sums of measured current values at the initial junctions J1, J2, J3, J4, J5 J6, J7 is limited, e.g. 31 out of 55 possible two-sensor fault scenarios are uniquely identifiable and 18 out of 165 three-sensor fault scenarios can be identified uniquely.

Consequently in a first instance the optimized identity matrix may additionally define only those uniquely identifiable multiple current sensor fault scenarios, i.e. include only an additional 31 error patterns if the uniquely identifiable two-sensor fault scenarios are of interest.

Alternatively, in a second instance the optimized identify matrix may additionally define all of the multiple current sensor fault scenarios, i.e. include an additional 55 error patterns in the case of two-sensor fault scenarios but with only 31 of these error patterns being unique.

Returning to the first converter 10 shown in the figures, following the unique identification of an individual faulty current sensor 28, e.g. the phase A current sensor 28', the first current sensor management unit 30 then, as set out above, replaces the measured current value of the faulty current sensor 28' with a calculated current value.

More particularly, the first current sensor management unit 30 replaces the measured current value of the faulty current sensor 28' with a calculated current value derived from the measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ of the other healthy current sensors 28.

In the embodiment described, the first current sensor management unit 30 is programmed to carry this out by rearranging the sums of measured current values previously established at the various initial junctions J1, J2, J3, J4, J5, J6, J7 (after first equating them to zero), to provide the missing current value.

For example, again with reference to a faulty phase A current sensor 28', replacement calculated current values $i_{PhaseA\_Calc}$ are given by:

$$\begin{cases} i_{PhaseA\_Calc1} = i_{TA} - i_{BA} \\ i_{PhaseA\_Calc2} = -i_{PhaseB} - i_{PhaseC} \end{cases}$$

Thereafter the first current sensor management unit 30 may select one of the available calculated current values $i_{PhaseA\_Calc1}$, $i_{PhaseA\_Calc2}$ or may calculate a single, comparable calculated current value $i_{PhaseA\_Calc}$ using a chosen form of mathematical modelling based on the available calculated current values $i_{PhaseA\_Calc1}$, $i_{PhaseA\_Calc2}$, such as for example:

$$i_{PhaseA\_Calc} = \frac{\sum_{j=1}^{n} i_{PhaseA\_Calcnj}}{n};$$

$i_{PhaseA\_Calc} = \min\{i_{PhaseA\_Calc1}, i_{PhaseA\_Calcn}\}$;

$i_{PhaseA\_Calc} = \max\{i_{PhaseA\_Calc1}, i_{PhaseA\_Calcn}\}$; or $i_{PhaseA\_Calc} = \text{random}\{i_{PhaseA\_Calc1}, i_{PhaseA\_Calcn}\}$ In addition to the foregoing, the first current sensor management unit 30 is further programmed to compare measured current values from a current sensor 28 identified as faulty with calculated equivalent current values and, if the measured current values equal the corresponding calculated equivalent current values within a predetermined time period, reclassify the current sensor 28 as healthy, i.e. is further programmed to discern between a permanently inoperative faulty current sensor 28 and a current sensor 28 that is only temporarily providing an erroneous measured current value.

For example, if the phase A current sensor 28' is again identified as being faulty, the first current sensor management unit 30 compares a sequence of measured current values $i_{PhaseA}$ with a corresponding sequence of calculated equivalent current values, which may be one or other of the replacement calculated values $i_{PhaseA\_Calc1}$, $i_{PhaseA\_Calc2}$ mentioned above or a single, comparable calculated current value $i_{PhaseA\_Calc}$ chosen from associated mathematical modelling. If the measured current value $i_{PhaseA}$ comes back into line with, i.e. equals, the calculated equivalent current value $i_{PhaseA\_Calc1}$, $i_{PhaseA\_Calc2}$, $i_{PhaseA\_Calc}$ after a given period the first current sensor management unit 30 reclassifies the faulty phase A current sensor 28' as healthy, such that its measured current value $i_{PhaseA}$ is no longer ignored.

In other embodiments of the invention the first current sensor management unit 30 may be still further programmed to correct a constant error in a received measured current value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ from one or more of the current sensors 28. Such a first current sensor management unit 30 may correct the said constant error by adding or subtracting a bias to the measured current value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ or applying a constant gain to the measured current value $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$.

The first current sensor management unit 30 may also be connectable via a bi-directional communication interface with a human operator so as to be able to provide additional information on the health of the current sensors 28. Such additional information might include:

the number of constant errors being corrected the manner in which the constant errors are being corrected;

identification of the current sensors having such a constant error corrected;

the number of healthy current sensors;

the number of faulty current sensors;

identification of the or each faulty current sensor; and details of any reclassified current sensors.

Yet more embodiments of the first converter 10 may additionally include a converter control unit (not shown) that is programmed to shut down the first converter 10 if the first current sensor management unit 30 identifies at least one faulty current sensor 28' that is permanently inoperative.

A converter according to a second embodiment of the invention is designated generally by reference numeral 100.

The second converter 100 is almost identical to the first converter 10 and is likewise illustrated schematically in FIG. 1. The second converter 100 does, however, differ from the first converter 10 in that it includes a second current sensor management unit 130 which, while being very similar to the first current sensor management unit 30 included in the first converter 10, is programmed in a different manner to the first current sensor management unit 30.

In particular, the second current sensor management unit 130 is, as well as being programmed to uniquely identify each individual faulty current sensor 28, is additionally programmed to uniquely identify all possible pairs of first and second faulty current sensors 28.

To provide this extra functionality the second current sensor management unit 130 is programmed firstly to establish a respective sum of measured current values at each of an extended number of junction locations (not shown) within the second converter 100. The extended number of junctions is larger than the initial number of junctions, i.e. the seven junctions J1, J2, J3, J4, J5, J6, J7 described above in connection with the first converter 10.

More particularly, the extended number of junctions includes each of the initial junctions J1, J2, J3, J4, J5, J6, J7, together with 33 other junction locations based on combinations of the initial junction locations J1, J2, J3, J4, J5, J6, J7. This gives rise to forty corresponding respective sums of measured current values, as detailed in the table below in which each sum is identified as an equation, with equation numbers 1 to 7, i.e. Eq. 1 to Eq. 7, being equivalent to the respective sum of measured current values established at a corresponding one of the initial junctions J1, J2, J3, J4, J5, J6, J7 (as set out hereinabove in connection with the first converter 10):

converter 10) includes only seven rows (corresponding to the sum of measured current values at each of the initial junctions J1, J2, J3, J4, J5, J6, J7) and eleven columns (corresponding to the eleven possible individually faulty

| Junction/Equation number | Sum of measured current values |
|---|---|
| Eq. 1 | $0 = i_{PhaseA} - i_{TA} + i_{BA}$ |
| Eq. 2 | $0 = i_{PhaseB} - i_{TB} + i_{BB}$ |
| Eq. 3 | $0 = i_{PhaseC} - i_{TC} + i_{BC}$ |
| Eq. 4 | $0 = i_{DCT} - i_{TA} - i_{TB} - i_{TC}$ |
| Eq. 5 | $0 = i_{DCB} - i_{BA} - i_{BB} - i_{BC}$ |
| Eq. 6 | $0 = i_{PhaseA} + i_{PhaseB} + i_{PhaseC}$ |
| Eq. 7 = Eq. 1 − Eq. 6 | $0 = -i_{PhaseB} - i_{PhaseC} - i_{TA} + i_{BA}$ |
| Eq. 8 = Eq. 1 − Eq. 4 | $0 = i_{PhaseA} - i_{DCT} + i_{TB} + i_{TC} + i_{BA}$ |
| Eq. 9 = Eq. 1 − Eq. 5 | $0 = i_{PhaseA} + i_{DCB} - i_{TA} - i_{BB} - i_{BC}$ |
| Eq. 10 = Eq. 2 − Eq. 6 | $0 = -i_{PhaseA} - i_{PhaseC} - i_{TB} + i_{BB}$ |
| Eq. 11 = Eq. 2 − Eq. 4 | $0 = i_{PhaseB} - i_{DCT} + i_{TA} + i_{TC} + i_{BB}$ |
| Eq. 12 = Eq. 2 + Eq. 5 | $0 = i_{PhaseB} + i_{DCB} - i_{TB} - i_{BA} - i_{BC}$ |
| Eq. 13 = Eq. 3 − Eq. 6 | $0 = -i_{PhaseA} - i_{PhaseB} - i_{TC} + i_{BC}$ |
| Eq. 14 = Eq. 3 − Eq. 4 | $0 = i_{PhaseC} - i_{DCT} + i_{TA} + i_{TB} + i_{BC}$ |
| Eq. 15 = Eq. 3 + Eq. 5 | $0 = i_{PhaseC} + i_{DCB} - i_{TC} - i_{BA} - i_{BB}$ |
| Eq. 16 = −Eq. 6 + Eq. 1 + Eq. 2 | $0 = -i_{PhaseC} - i_{TA} - i_{TB} + i_{BA} + i_{BB}$ |
| Eq. 17 = −Eq. 6 + Eq. 1 + Eq. 3 | $0 = -i_{PhaseB} - i_{TA} - i_{TC} + i_{BA} + i_{BC}$ |
| Eq. 18 = Eq. 1 + Eq. 2 − Eq. 4 | $0 = i_{PhaseA} + i_{PhaseB} - i_{DCT} + i_{TC} + i_{BA} + i_{BB}$ |
| Eq. 19 = Eq. 1 + Eq. 3 − Eq. 4 | $0 = i_{PhaseA} + i_{PhaseC} - i_{DCT} + i_{TB} + i_{BA} + i_{BC}$ |
| Eq. 20 = Eq. 1 + Eq. 2 − Eq. 5 | $0 = i_{PhaseA} + i_{PhaseB} + i_{DCB} - i_{TA} - i_{TB} - i_{BC}$ |
| Eq. 21 = Eq. 1 + Eq. 3 − Eq. 5 | $0 = i_{PhaseA} + i_{PhaseC} + i_{DCB} - i_{TA} - i_{TC} - i_{BB}$ |
| Eq. 22 = −Eq. 6 + Eq. 2 + Eq. 3 | $0 = -i_{PhaseA} - i_{TB} - i_{TC} + i_{BB} + i_{BC}$ |
| Eq. 23 = Eq. 2 + Eq. 3 − Eq. 4 | $0 = i_{PhaseB} + i_{PhaseC} - i_{DCT} + i_{TA} + i_{BB} + i_{BC}$ |
| Eq. 24 = Eq. 2 + Eq. 3 − Eq. 5 | $0 = i_{PhaseB} + i_{PhaseC} + i_{DCB} - i_{TB} - i_{TC} - i_{BA}$ |
| Eq. 25 = Eq. 6 − Eq. 1 + Eq. 4 | $0 = i_{PhaseB} + i_{PhaseC} + i_{DCT} - i_{TB} - i_{TC} - i_{BA}$ |
| Eq. 26 = Eq. 6 − Eq. 2 + Eq. 4 | $0 = i_{PhaseA} + i_{PhaseC} + i_{DCT} - i_{TA} - i_{TC} - i_{BB}$ |
| Eq. 27 = Eq. 6 − Eq. 3 + Eq. 4 | $0 = i_{PhaseA} + i_{PhaseB} + i_{DCT} - i_{TA} - i_{TB} - i_{BC}$ |
| Eq. 28 = −Eq. 6 + Eq. 1 + Eq. 5 | $0 = -i_{PhaseB} - i_{PhaseC} + i_{DCB} - i_{TA} - i_{BB} - i_{BC}$ |
| Eq. 29 = −Eq. 6 + Eq. 2 + Eq. 5 | $0 = -i_{PhaseA} - i_{PhaseC} + i_{DCB} - i_{TB} - i_{BA} - i_{BC}$ |
| Eq. 30 = −Eq. 6 + Eq. 3 + Eq. 5 | $0 = -i_{PhaseA} - i_{PhaseB} + i_{DCB} - i_{TC} - i_{BA} - i_{BB}$ |
| Eq. 31 = −Eq. 6 + Eq. 1 + Eq. 2 − Eq. 4 | $0 = -i_{PhaseC} - i_{DCT} + i_{TC} + i_{BA} + i_{BB}$ |
| Eq. 32 = −Eq. 6 + Eq. 1 + Eq. 2 − Eq. 5 | $0 = -i_{PhaseC} + i_{BDC} - i_{TA} - i_{TB} - i_{BC}$ |
| Eq. 33 = −Eq. 6 + Eq. 1 + Eq. 3 − Eq. 4 | $0 = -i_{PhaseB} - i_{DCT} + i_{TB} + i_{BA} + i_{BC}$ |
| Eq. 34 = −Eq. 6 + Eq. 1 + Eq. 3 − Eq. 5 | $0 = -i_{PhaseB} + i_{DCB} - i_{TA} - i_{TC} - i_{BB}$ |
| Eq. 35 = −Eq. 6 + Eq. 2 + Eq. 3 − Eq. 4 | $0 = -i_{PhaseA} - i_{DCT} + i_{TA} + i_{BB} + i_{BC}$ |
| Eq. 36 = −Eq. 6 + Eq. 2 + Eq. 3 − Eq. 5 | $0 = -i_{PhaseA} + i_{DCB} - i_{TB} - i_{TC} - i_{BA}$ |
| Eq. 37 = −Eq6. + Eq. 1 + Eq. 2 + Eq. 3 | $0 = -i_{TA} - i_{TB} - i_{TC} + i_{BA} + i_{BB} + i_{BC}$ |
| Eq. 38 = Eq. 1 + Eq. 2 + Eq. 3 − Eq. 4 − Eq. 6 | $0 = -i_{DCT} + i_{BA} + i_{BB} + i_{BC}$ |
| Eq. 39 = −Eq. 1 − Eq. 2 − Eq. 3 + Eq. 5 + Eq. 6 | $0 = i_{DCB} - i_{TA} - i_{TB} - i_{TC}$ |
| Eq. 40 = Eq. 7 | $0 = -i_{DCT} + i_{DCB}$ |

The second current sensor management unit 130 is then programmed to similarly detect an error in a respective sum of measured current values, i.e. in one of the sums set out in the table above, when the sum differs from a corresponding threshold current value $\Delta I_{Threshold}$. The corresponding threshold current value $\Delta I_{Threshold}$ is again selected as being the same value, zero, for each current sensor 28. In other embodiments, however, a different value may again be chosen, and indeed one or more different values may be chosen for different current sensors 28.

An error pattern representing the or each erroneous sum detected is then established by the second current sensor management unit 130. The error pattern similarly takes the form of a vector, i.e. a detection vector, but in this embodiment the detection vector has forty rows, each of which corresponds to an outcome of a respective one of the sums, i.e. equations, set out in the table above.

Programming of the second current sensor management unit 130 then causes it to compare the established error pattern, i.e. the established 40-row detection vector, with a predetermined extended error reference.

The extended error reference similarly takes the form of a matrix, and more particularly an extended identity matrix. However, whereas the identity matrix 34 (shown at FIG. 2(*b*) and described hereinabove in relation to the first current sensors), the extended identity matrix includes forty rows (corresponding to the sum of measured current values at each of the extended number of junctions, i.e. the forty sums in the above table) and sixty-six columns.

The sixty-six columns include a first group of eleven columns which correspond to the eleven possible individually faulty current sensors, as well as a second group of fifty-five columns each of which corresponds to a possible pair of faulty current sensors, e.g. faulty phase A and phase B current sensors 28', 28".

Thereafter the second current sensor management unit 130 is programmed to identify both a given individual faulty current sensor and a given pair of first and second faulty current sensors by matching the established error pattern, i.e. the 40-row detection vector, with an identical corresponding error pattern in the extended error reference, i.e. the extended identity matrix.

More particularly the second current sensor management unit 130 is programmed to match the 40-row detection vector with a column within the first group of eleven columns in the extended identity matrix which has the same pattern of zeros and ones in order to identify a given individual faulty current sensor, and to match the 40-row detection vector with a column within the second group of fifty-five columns in the extended identity matrix that has the same pattern of zeros and ones in order to identify a given pair of faulty current sensors.

In further embodiments of the invention (not shown) the second current sensor management unit 130 may also similarly be additionally programmed to identify a plurality of three or more faulty current sensors from the same received measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ and a consideration of the respective sums of measured current values at the extended number of junctions.

For example, the second current sensor management unit 130 may be programmed to compare the error pattern representing the or each erroneous sum detected, i.e. the 40-row detection vector, with an optimized extended error reference, i.e. an optimized extended identity matrix, which is similar to the extended identify matrix mentioned above but additionally defines uniquely discernible possible error patterns corresponding to three or more concurrently faulty current sensors, i.e. includes additional columns each of which corresponds to an error pattern relating to three or more concurrently faulty current sensors.

Again the number of, e.g. triple and quadruple, current sensor fault scenarios that are uniquely identifiable based on the aforementioned number of measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ and respective sums of measured current values at the extended number of junctions is limited, and so the optimized extended identity matrix may additionally define only those uniquely identifiable triple and quadruple current sensor fault scenarios or may additionally define all of the triple and quadruple current sensor fault scenarios but with only some of the corresponding error patterns being unique.

Returning to the second converter 100, following the unique identification of an individual faulty current sensor 28, e.g. the phase A current sensor 28', or the unique identification of a pair of faulty current sensors, e.g. the phase A and phase B current sensors 28', 28", the second current sensor management unit 130 is again then programmed to replace the measured current value of the or each faulty current sensor 28', 28" with a calculated current value.

In relation to the replacement of the measured current value of a single, individual faulty current sensor 28', the second current sensor management unit 130 again replaces the measured current value of the faulty current sensor 28' with a calculated current value derived from the measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ of the other healthy current sensors 28.

The second current sensor management unit 130 again achieves this by rearranging the sums of measured current values previously established at the various extended number of junctions (after first equating them to zero), to provide the missing current value. In this embodiment however, the larger number of junctions and corresponding sums of measured current values gives rise to a larger number of possible replacement calculated current values.

For example, again with reference to a faulty phase A current sensor 28', a replacement calculated current value $i_{PhaseA\_Calc}$ is given by any of:

$$i_{PhaseA\_Calc} = \frac{\sum_{j=1}^{n} i_{PhaseA\_Calcnj}}{n};$$

$$i_{PhaseA\_Calc} = \min\{i_{PhaseA\_Calc1}, i_{PhaseA\_Calcn}\};$$

-continued $$i_{PhaseA\_Calc} = \max\{i_{PhaseA\_Calc1}, i_{PhaseA\_Calcn}\}; \text{ or}$$

$$i_{PhaseA\_Calc} = \text{random}\{i_{PhaseA\_Calc1}, i_{PhaseA\_Calcn}\}$$

Thereafter the second current sensor management unit 130 may again select one of the available calculated current values $i_{PhaseA\_Calc1}$, $i_{PhaseA\_Calc2}$ etc, or may calculate a single, comparable calculated current value $i_{PhaseA\_Calc}$ using a chosen form of mathematical modelling based on the available calculated current values $i_{PhaseA\_Calc1}$, $i_{PhaseA\_Calc2}$ etc, such as again for example:

$$\begin{cases} i_{PhaseA\_Calc1} = i_{TA} - i_{BA} \\ i_{PhaseA\_Calc2} = -i_{PhaseB} - i_{PhaseC} \\ i_{PhaseA\_Calc3} = i_{DCT} - i_{TB} - i_{TC} - i_{BA} \\ i_{PhaseA\_Calc4} = i_{DCT} - i_{TB} + i_{TA} + i_{BB} + i_{BC} \\ i_{PhaseA\_Calc5} = -i_{PhaseC} - i_{TB} + i_{BB} \\ i_{PhaseA\_Calc6} = -i_{PhaseB} - i_{TC} + i_{BC} \\ i_{PhaseA\_Calc7} = -i_{PhaseB} + i_{DCT} - i_{TC} - i_{BA} - i_{BB} \\ i_{PhaseA\_Calc8} = -i_{PhaseC} + i_{DCT} - i_{TB} - i_{BA} - i_{BC} \\ i_{PhaseA\_Calc9} = -i_{PhaseB} - i_{DCB} + i_{TA} + i_{TB} + i_{BC} \\ i_{PhaseA\_Calc10} = -i_{PhaseC} - i_{DCB} + i_{TA} + i_{TC} + i_{BB} \\ i_{PhaseA\_Calc11} = -i_{TB} - i_{TC} + i_{BB} + i_{BC} \\ i_{PhaseA\_Calc12} = -i_{PhaseC} - i_{DCT} + i_{TA} + i_{TC} + i_{BB} \\ i_{PhaseA\_Calc13} = -i_{PhaseB} - i_{DCT} + i_{TA} + i_{TB} + i_{TC} \\ i_{PhaseA\_Calc14} = -i_{PhaseC} + i_{DCB} - i_{TB} - i_{BA} - i_{BC} \\ i_{PhaseA\_Calc15} = -i_{PhaseB} + i_{DCB} - i_{TC} - i_{BA} - i_{BB} \\ i_{PhaseA\_Calc16} = -i_{DCT} + i_{TA} + i_{BB} + i_{BC} \\ i_{PhaseA\_Calc17} = i_{DCT} - i_{TB} - i_{TC} - i_{BA} \end{cases}$$

In relation to the replacement of the measured current value of a pair of faulty current sensors 28', 28" the second current sensor management unit 130 replaces the measured current value of each faulty current sensor 28', 28" with a corresponding calculated current value derived from the measured current values $i_{TA}$, $i_{BA}$, $i_{TB}$, $i_{BB}$, $i_{TC}$, $i_{BC}$, $i_{DCT}$, $i_{DCB}$, $i_{PhaseA}$, $i_{PhaseB}$, $i_{PhaseC}$ of the other healthy current sensors 28.

The second current sensor management unit 130 similarly achieves this by rearranging the sums of measured current values previously established at the various extended number of junctions (after first equating them to zero), to provide the missing current value.

For example, again with reference to faulty phase A and phase B current sensors 28', 28" respective replacement calculated current values $i_{PhaseA\_Calc}$, $i_{PhaseB\_Calc}$ may be given by $$i_{PhaseA\_Calc} = i_{TA} - i_{BA}; \text{ and}$$

$$i_{PhaseB\_Calc} = i_{TB} - i_{BB}$$

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A converter, for use in HVDC power transmission and distribution, the converter comprising:
   first and second DC terminals for connection to a DC electrical network and between which extends a plurality of converter limbs, each converter limb including first and second limb portions separated by an AC terminal for connection to a respective phase of a multi-phase AC electrical network, and each limb portion including a current sensor to measure current flowing in the corresponding limb portion;
   a plurality of further current sensors located elsewhere in the converter, the plurality of further current sensors includes a respective current sensor operatively associated with each of the first and second DC terminals to measure current flowing into or out of the converter via the corresponding said first or second DC terminal; and
   a current sensor management unit programmed to:
   (a) receive a measured current value from each current sensor;
   (b) identify at least one faulty current sensor from the received measured current values; and
   (c) replace the measured current value of the or each identified faulty current sensor with a calculated current value.

2. The converter according to claim 1, wherein the plurality of further current sensors includes a respective current sensor operatively associated with each of the AC terminals to measure current flowing into or out of the converter via the corresponding said AC terminal.

3. The converter according to claim 1, wherein the current sensor management unit is programmed to identify at least one faulty current sensor from the received measured current values by:
   establishing a respective sum of measured current values at each of a plurality of junction locations within the converter;
   detecting an error in a respective sum of measured current values when the sum differs from a corresponding threshold current value;
   establishing an error pattern representing the or each erroneous sum detected;
   comparing the error pattern with a predetermined error reference defining a range of possible error patterns and corresponding faulty current sensors giving rise to the said possible error patterns; and
   identifying one or more faulty current sensors by matching the established error pattern with an identical corresponding possible error pattern in the error reference.

4. The converter according to claim 3, wherein the current sensor management unit is programmed to uniquely identify each individual faulty current sensor from the received measured current values by:
   establishing a respective sum of measured current values at each of an initial number of junction locations within the converter;
   detecting an error in a respective sum of measured current values when the sum differs from a corresponding threshold current value;
   establishing an error pattern representing the or each erroneous sum detected;
   comparing the error pattern with a predetermined error reference defining all possible error patterns corresponding to each current sensor being faulty individually; and
   identifying a given individual faulty current sensor by matching the established error pattern with an identical corresponding possible error pattern in the error reference.

5. The converter according to claim 4, wherein the current sensor management unit is additionally programmed to identify a plurality of multiple faulty current sensors from the received measured current values by:
   establishing a respective sum of measured current values at each of the initial number of junction locations within the converter;
   detecting an error in a respective sum of measured current values when the sum differs from a corresponding threshold current value;
   establishing an error pattern representing the or each erroneous sum detected;
   comparing the error pattern with a predetermined optimized error reference additionally defining uniquely discernible possible error patterns corresponding to multiple concurrently faulty current sensors; and
   identifying a given group of multiple faulty current sensors by matching the established error pattern with an identical corresponding possible error pattern in the error reference.

6. The converter according to claim 1, wherein the current sensor management unit is programmed to uniquely identify all possible pairs of faulty current sensors from the received measured current values by:
   establishing a respective sum of measured current values at each of an extended number of junction locations within the converter, the extended number of junctions being larger than the initial number of junctions;
   detecting an error in a respective sum of measured current values when the sum differs from a corresponding threshold current value;
   establishing an error pattern representing the or each erroneous sum detected;
   comparing the error pattern with a predetermined extended error reference defining all possible error patterns corresponding to faulty pairs of current sensors; and
   identifying a given pair of faulty current sensors by matching the established error pattern with an identical corresponding possible error pattern in the extended error reference.

7. The converter according to claim 6, wherein the current sensor management unit is additionally programmed to identify a plurality of three or more faulty current sensors from the received measured current values by:
   establishing a respective sum of measured current values at each of the extended number of junction locations within the converter;
   detecting an error in a respective sum of measured current values when the sum differs from a corresponding threshold current value;
   establishing an error pattern representing the or each erroneous sum detected;
   comparing the error pattern with a predetermined optimized extended error reference additionally defining uniquely discernible possible error patterns corresponding to three or more concurrently faulty current sensors; and identifying a given group of three or more faulty current sensors by matching the established error pattern with an identical corresponding possible error pattern in the error reference.

8. The converter according to claim 3, wherein the corresponding threshold current value is the same for each current sensor.

9. The converter according to claim 3, wherein the corresponding threshold current value for at least one current sensor is tailored specifically to the current sensor.

10. The converter according to claim 3, wherein the established error pattern takes the form of a vector and each corresponding error reference takes the form of a matrix.

11. The converter according to claim 1 wherein the current sensor management unit is programmed to replace the measured current value of the or each identified faulty current sensor with a calculated current value derived from the measured current values from the other healthy current sensors.

12. The converter according to claim 1, wherein the current sensor management unit is further programmed to compare measured current values from a current sensor identified as faulty with calculated equivalent current values and, if the measured current values equal the corresponding calculated equivalent current values within a predetermined time period, reclassify the current sensor as healthy.

13. The converter according to claim 1, wherein the current sensor management unit is further programmed to correct a constant error in a received measured current value from one or more current sensors.

14. The converter according to claim 1 additionally comprising a converter control unit programmed to shut down the converter if the current sensor management unit identifies at least one faulty current sensor that is permanently inoperative.

* * * * *